June 28, 1932.  C. H. NAATZ  1,865,034

MILK WEIGHT GAUGE AND FEEDING GUIDE

Filed Feb. 23, 1929

INVENTOR
CHARLES H. NAATZ
BY
ATTORNEY

Patented June 28, 1932

1,865,034

UNITED STATES PATENT OFFICE

CHARLES H. NAATZ, OF ST. JOHNSBURY, VERMONT

MILK WEIGHT GAUGE AND FEEDING GUIDE

Application filed February 23, 1929. Serial No. 342,114.

This invention relates to milk pails and more particularly to milk pails provided with milk weight gauges and feeding guides.

Within recent years, an important feature of dairy development has been the formation of cow-test associations, the chief purpose of which is to see that the production of each cow and the value of the food consumed by each cow in the herds of the members of these associations are carefully recorded for the year. The records thus obtained evidenced that many dairy cows were kept at a loss; that is, the value of their milk was less than the value of their feed. Some such "robber" cows were found in most herds. In order to determine the quantity of milk given by a particular cow, it was necessary to empty the milk from the milking pail or milking machine unit into a receptacle suspended from a set of spring-balances and the milk weighed. These balances were often situated at a point in the barn remote from the cow stalls so that the obtaining of the cow records entailed much time and labor which many dairymen could not afford. For this reason, many of the dairymen, though they realized the value of individual cow records and desired to develop a profitable herd of dairy cattle, were unable to gather accurate information concerning the milk production of their cows.

Another factor which contributed to lower considerably the profits derived from the dairy herd was the result of indiscriminate feeding; that is, each cow in the herd was given the same grain ration irrespective of the quantity of milk given. The cow-test associations have found that the proper grain ration for a cow is one pound of grain for every three pounds of milk given. To give a cow more than this amount was to overfeed her and a waste of grain and to underfeed the cow brought about a reduction in the flow of milk. It will be seen, accordingly, that either overfeeding or underfeeding dairy cattle would result in loss of profit to the dairyman and that a knowledge of the proper ration for each cow of the herd would tend to increase his profits.

It is an object of this invention to provide an improved device for determining the weight of milk given by and the proper ration for a cow, which will be free from the above-mentioned and other disadvantages and which will be especially simple in construction, inexpensive to manufacture and efficient in operation.

Another object of this invention is the provision in a vessel adapted to receive milk, of improved means for indicating the weight of milk contained therein and its ration value. In the illustrative construction, this means comprises a glass strip suitably secured within an opening in the vessel, said strip having graduations thereon representing the weight of milk contained in the vessel and the ration value thereof.

Other features of the invention, together with certain details of construction and combinations of parts, will be described in the specification and pointed out in the appended claims.

In the drawing.

Similar characters of reference indicate corresponding parts throughout the several views of the drawing.

Figure 1:
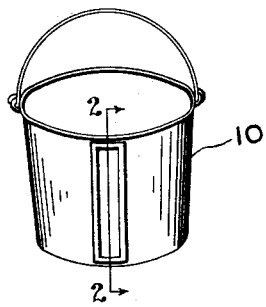
Figure 1 is a perspective view of a milk pail in which my invention is embodied.
Figure 2:
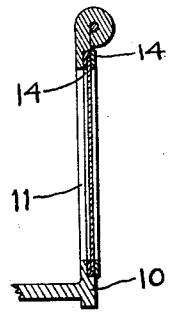
Figure 2 is an enlarged cross-sectional view taken on line 2—2 in Figure 1.
Figure 3:
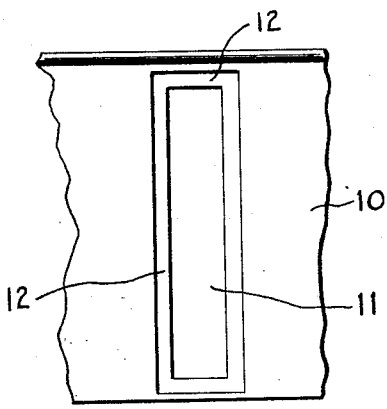
Figure 3 is an enlarged fragmental view showing the countersunk border about the aperture formed in the side of the milk pail.
Figure 4:
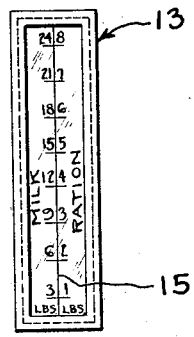
Figure 4 is a detail view of my improved indicating means.

Referring to the drawing there is shown a pail generally indicated by the reference numeral 10. This pail is preferably of the type commonly known as a milk pail. In the side of the pail and extending substantially the entire height thereof is a rectangular aperture 11, the edges of which are countersunk, as at 12, to form a seat for a sash 13 which may be secured in said seat in any suitable manner, as by soldering. The sash is formed of two metallic frames 14 having a pane of glass 15 cemented therebetween.

The glass is graduated, the graduations 16 representing the pounds of milk and the graduations 17 representing the ration value of the milk; that is, the proper grain ration for a cow giving a certain weight of milk. It will be readily apparent that the dairyman by merely glancing at the graduated glass 15 after a milking can ascertain at once without resorting to a spring-balance and without any calculations the weight of the milk contained in the pail and the quantity of grain that the cow should be fed, thus saving him much time and labor and increasing his profits through grain saved and increased milk production.

Figure 5:
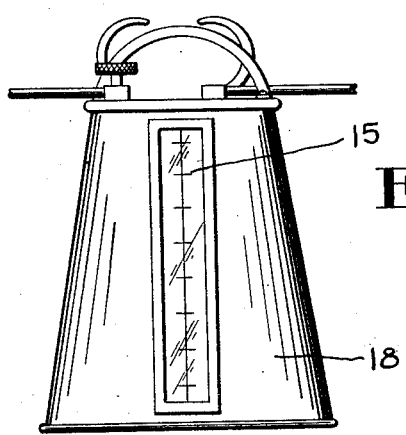
Figure 5 is an elevational view showing my invention as embodied in a milking machine unit.

In Figure 5 there is shown my weight gauge and feeding guide applied to a milking machine unit 18. With my improved device the dairyman no longer finds is necessary to relieve the vacuum and remove the closure top to ascertain the quantity of milk given by a cow, that information being obtained by an inspection of the graduated glass mounted in the sidewall of the unit.

The expression "ration value" as used in the specification and hereinafter in the claims is to be construed to mean the quantity of grain which is to be fed to the cow.

Having thus described my invention, what I claim as new and desire to secure by Letters Patent of the United States is:

1. A milk pail having an aperture therein, a countersunk seat surrounding said aperture, a sash disposed in said seat and a transparent chart having indicia thereon, said indicia being adapted to indicate the quantity by weight of the contents of the milk pail and the ration value thereof.

2. A milk pail having an aperture therein, a countersunk seat surrounding said aperture and a sash comprising a pair of frames having a pane of glass therebetween disposed in said seat, said pane of glass having indicia thereon, said indicia being adapted to indicate the quantity by weight of the contents of the milk pail and the ration value thereof.

In testimony whereof I have signed my name to this specification.

CHARLES H. NAATZ.